(12) United States Patent
Nakazawa et al.

(10) Patent No.: US 9,369,065 B2
(45) Date of Patent: Jun. 14, 2016

(54) POWER CONVERSION DEVICE

(71) Applicant: Kabushiki Kaisha Toshiba, Minato-ku, Tokyo (JP)

(72) Inventors: Yosuke Nakazawa, Kunitachi (JP); Takeru Murao, Warabi (JP); Masahiro Tsumenaga, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 98 days.

(21) Appl. No.: 14/286,866

(22) Filed: May 23, 2014

(65) Prior Publication Data
US 2014/0254226 A1 Sep. 11, 2014

Related U.S. Application Data

(63) Continuation of application No. PCT/JP2012/080359, filed on Nov. 22, 2012.

(30) Foreign Application Priority Data

Nov. 24, 2011 (JP) ................. 2011-256825

(51) Int. Cl.
*H02M 7/537* (2006.01)
*H02M 7/483* (2007.01)

(52) U.S. Cl.
CPC .............. *H02M 7/537* (2013.01); *H02M 7/483* (2013.01); *H02M 2007/4835* (2013.01)

(58) Field of Classification Search
CPC ...................... H02M 3/33569; H02M 3/33592; H02M 3/335; H02M 3/33507; H02M 3/33538; H02M 3/33523; H02M 3/3376; H02M 5/4585; H02M 5/458; H02M 5/4505; H02M 7/48; H02M 7/53871; H02M 7/5387; H02M 7/53875; H02M 7/537; H02M 7/003; H02M 7/538

USPC .......... 363/16, 20, 21.01, 37, 95, 98, 131–132
See application file for complete search history.

(56) References Cited

U.S. PATENT DOCUMENTS 5,963,436 A    10/1999   Yoshida
6,252,782 B1    6/2001   Akashi et al.
(Continued)

FOREIGN PATENT DOCUMENTS

EP    0 902 531 A1    3/1999
EP    1 009 094 A2    6/2000
(Continued)

OTHER PUBLICATIONS

The extended European search report issued by European Patent Office on Sep. 15, 2015 in the corresponding European patent application No. 12851310.8—6 pages.
(Continued)

*Primary Examiner* — Gary L Laxton
*Assistant Examiner* — Kevin H Sprenger
(74) *Attorney, Agent, or Firm* — Knobbe, Martens, Olson & Bear LLP

(57) ABSTRACT

An inexpensive and space-saving power conversion device is provided which can eliminate a high-cost and large reactor like a buffer reactor. A device includes multiple switching elements 21u, 21x performing conversion between DC and AC upon switching, a unitary unit C including the switching elements 21u, 21x, and a capacitor 30, and unit arms 10P, 10N each including at least one unitary unit C. The primary side of a transformer 40 is connected between the pair of unit arms 10P, 10N so as to suppress a short-circuit current by a leakage inductance component.

6 Claims, 7 Drawing Sheets

(56) References Cited

U.S. PATENT DOCUMENTS

| | | |
|---|---|---|
| 8,233,300 B2 | 7/2012 | Dommaschk et al. |
| 8,493,756 B2 * | 7/2013 | Moki ............... H02M 7/1626 363/132 |
| 2005/0190583 A1 * | 9/2005 | Morimoto ........... H02M 1/34 363/24 |
| 2010/0118578 A1 | 5/2010 | Dommaschk et al. |
| 2012/0257430 A1 * | 10/2012 | Truettner ............ H02M 7/487 363/131 |
| 2012/0307529 A1 * | 12/2012 | Chiba ................. H02M 1/08 363/17 |

FOREIGN PATENT DOCUMENTS

| JP | 11-089232 A | 3/1999 |
|---|---|---|
| JP | 2000-232781 A | 8/2000 |
| JP | 2004-040923 A | 2/2004 |
| JP | 2006-304578 A | 11/2006 |
| JP | 2010-512134 A | 4/2010 |
| JP | 2010-233411 A | 10/2010 |

OTHER PUBLICATIONS

International Search Report mailed by Japan Patent Office on Feb. 26, 2013 in the corresponding PCT Application No. PCT/JP2012/080359.

Background Art Documents.

Notification of the First Office Action (National Phase of PCT Application) issued by State Intellectual Property Office (SIPO) of the People's Republic of China on Nov. 4, 2015 in the corresponding Chinese Application No. 201280057663.6—10 pages.

* cited by examiner

POWER CONVERSION DEVICE

CROSS-REFERENCE TO RELATED APPLICATIONS

This application is a Continuation of PCT Application No. PCT/JP2012/080359, filed on Nov. 22, 2012, and claims priority to Japanese Patent Application No. 2011-256825, filed on Nov. 24, 2011, the entire contents of both of which are incorporated herein by reference.

TECHNICAL FIELD

Embodiments of the present disclosure relate to a power conversion device that mutually converts power between AC and DC.

BACKGROUND ART

Power conversion devices that mutually convert power between AC and DC are applied to various applications. For example, a three-phase-two-level type is utilized as a converter that converts AC from a power system into DC, and an inverter that converts AC into DC to drive a motor. The three-phase-two-level is a technology of selecting six switches at two levels of ON and OFF, thereby performing power conversion between DC and three-phase AC.

A switching element that performs switching which is a change between ON and OFF is a semiconductor element. In general, an IGBT (Insulated Gate Bipolar Transistor) is utilized as a switching element. The three-phase-two-level inverter can be configured by six such switching elements at minimum.

The control technology of the three-phase-two-level inverter is, in general, a PWM control. The PWM control is a technology of controlling a pulse width to control a level of an output AC voltage. When, for example, an input AC voltage is Vdc, switching is performed between two values of +Vdc/2 and −Vdc/2 at a predetermined timing for each phase. Hence, the output waveform from the three-phase-two-level inverter can be a pseudo-AC waveform.

Meanwhile, a necessity for a large-scale DC power feeding of which power loss is less than an AC power feeding is increasing recently. For example, power feeding through seafloor cables, 50-Hz/60-Hz conversion, and a long-distance DC power feeding from a remote large-scale solar power generation system to a consumer location are getting attention.

According to such a DC power feeding, DC subjected to ON/OFF is an extremely high voltage like 300 kV. Conversely, the IGBTs utilized as the switching elements have a rating of substantially 6500 V. Hence, when a large number of such switching elements are connected in series to be utilized as a multi-level inverter, a voltage applied to each switching element can be decreased.

SUMMARY

Technical Problem

According to the above-explained power conversion devices, a capacitor is sometimes utilized as a voltage source that changes the output of the voltage in accordance with a switching. In this case, for example, a unitary unit which connects a DC capacitor in parallel with two switching elements is configured. According to such a unitary unit, when the one switching element is ON, the voltage corresponding to the DC capacitor is output, and when the other switching element is ON, the output voltage becomes zero.

It is necessary for the DC capacitor configuring the unitary unit to control the voltage value to be constant so as to allow appropriate charging/discharging. Hence, A back-flow current that refluxes a DC power source is required to always flow through the unitary unit. More specifically, each phase is required to be provided with a short-circuited path for charging/discharging.

However, in a three-phase power conversion devices, three phases are connected to the same DC power source. Hence, when the DC voltage resultant values of respective phases differ even slightly, a large short-circuit current flows between the phases, which may affect the devices. Even if the average value of the DC voltage resultant value of each phase is consistent, when the ON/OFF timing and the cycle are different, the same technical problem occurs.

In order to address this technical problem, a buffer reactor is inserted in each phase so as to prevent the short-circuit current from becoming excessively large. However, the use of this buffer reactor results in an increase in the size of the whole device, and an increase in costs.

It is an objective of embodiments of the present disclosure to provide a power conversion device which can eliminate a high-cost and large reactor like a buffer reactor, and which is inexpensive and space-saving.

Solution to Problem

To address the aforementioned technical problems, a power conversion device according to an embodiment employs the following structure.

(1) A plurality of switching elements that performs conversion between DC and AC upon switching.

(2) A plurality of unitary units comprising the switching elements and a capacitor.

(3) A plurality of unit arms comprising at least one of the unitary units.

(4) A transformer having a primary winding connected between a pair of the unit arms so as to suppress a short-circuit current by a leakage inductance component.

DESCRIPTION OF EMBODIMENTS

[A. Structure According to Embodiment]

[1. Entire Structure]

Figure 1:
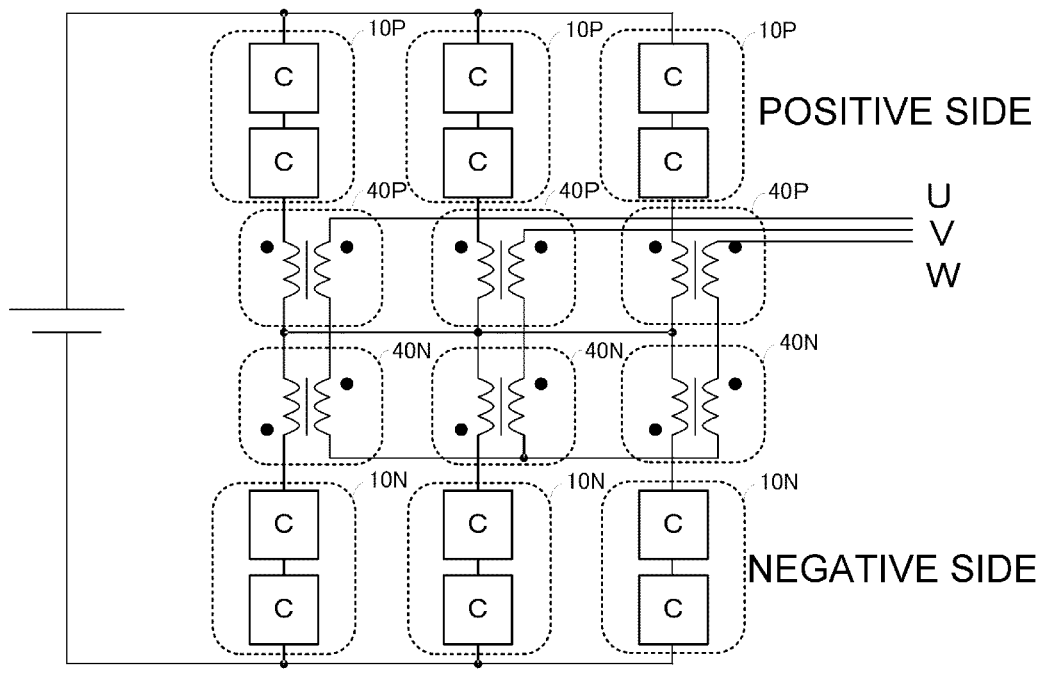
FIG. 1 is a circuit diagram illustrating an example structure of a power conversion device according to an embodiment.

A structure according to this embodiment will be explained with reference to FIGS. 1 and 2. According to this embodiment, a power conversion device is connected between a three-phase AC system and a DC system, and performs conversion between AC and DC. This power conversion device has, for each three phase, unit arms 10P, 10N that are positive and negative phase arms. The unit arms 10P, 10N are connected to an AC system through transformers 40P, 40N.

[2. Unit Arm]

Each of the positive unit arm 10P and the negative unit arm 10N has N number of unitary units C connected in series. The unitary unit C is a chopper bridge unit converter to be discussed later. FIG. 1 illustrates a case in which N=2, but it is fine if N≥1.

[3. Unitary Unit]

Figure 2:
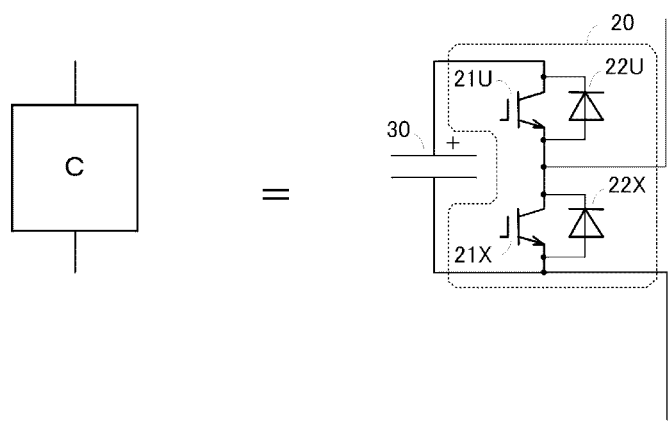
FIG. 2 is a circuit diagram illustrating a unitary unit in FIG. 1.

The chopper bridge unit converter that is the unitary unit C has, as illustrated in FIG. 2, a leg 20 and a capacitor 30 connected in parallel. In the leg 20, two switching elements 21U, 21X having a self-extinguishing function are connected in series. Example switching elements 21U, 21X are IGBTs. The respective switching elements 21U, 21X are connected with diodes 22U, 22X in a reverse-parallel manner. Those diodes 22U, 22X are feedback diodes.

[4. Transformer]

Each of the transformers 40P, 40N is a single-phase transformer for insulation having a winding ratio of 1:1 between the primary winding and the secondary winding. The transformers 40P, 40N are separately provided for the positive side and the negative side for each phase. The positive side in the primary and secondary windings of the transformers 40P, 40N are indicated by a black dot.

[5. Connection Relationship of Each Portion]

One end of each unit arm 10P of the positive side in each phase is connected to the positive side of the DC power source. The other end of each unit arm 10P in each phase is connected to the positive side of the primary winding of the positive transformer 40P.

One end of each unit arm 10N of the negative side in each phase is connected to the negative side of the DC power source. The other end of each unit arm 10N in each phase is connected to the positive side of the primary winding of the negative transformer 40N.

The negative side of the primary winding of the positive transformer 40P in each phase is connected with the negative side of the primary winding of the negative transformer 40N. In addition, the negative sides of the primary windings of the positive transformers 40P and the negative sides of the primary windings of the negative transformers 40N are connected between the three phases of the U phase, the V phase, and the W phase.

The secondary winding of the positive transformer 40P in each phase is connected with the secondary winding of the negative transformer 40N in series. The negative sides of the secondary windings of the negative transformers 40N are short-circuited in the three phases of the U phase, the V phase, and the W phase. The positive sides of the secondary windings of the positive transformers 40P are connected to the AC side as connection ends of the U phase, the V phase, and the W phase.

[B. Operation According to Embodiment]

[1. Utilization of Leakage Inductance]

Actual transformers always have leakage fluxes due to a magnetic leakage. The leakage fluxes do not contribute to a transformer operation, but work as a leakage inductance of the primary and secondary windings.

According to this embodiment, as will be discussed later, when the DC circulation current flows, the primary windings of the transformers 40P, 40N that are insulation transformers become the path of the DC circulation current. Hence, by the leakage inductance components of the primary windings of the transformers 40P and 40N, like a reactor, a sharp increase of the DC circulation current is suppressed.

Figure 3:
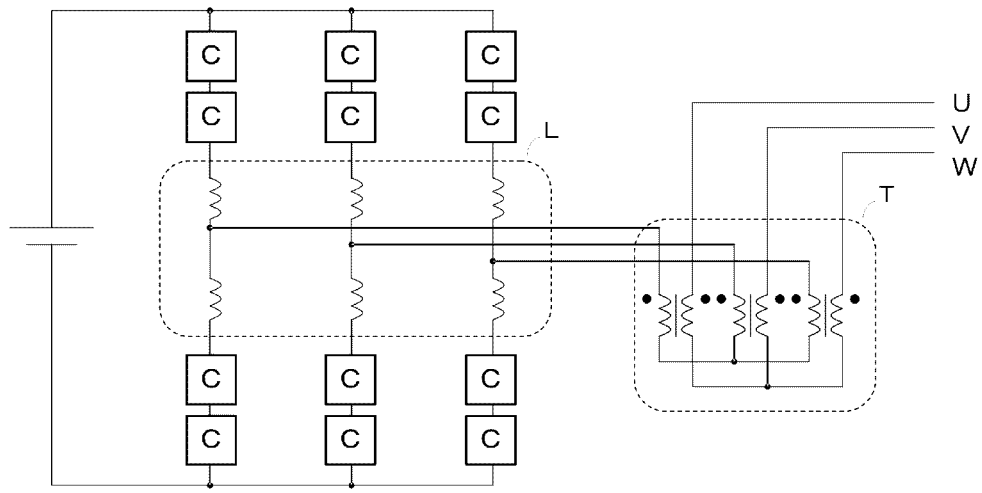
FIG. 3 is a circuit diagram illustrating an example structure of a power conversion device utilizing a reactor.

For example, as illustrated in FIG. 3, when a reactor L is installed and an insulation transformer T is utilized for an output to a system and for an insulation, the winding portion of the insulation transformer T is unavailable as a reactor. According to this embodiment, by employing the above-explained connection structure, the leakage inductance components of the transformers 40P, 40N at the primary side can serve as a reactor.

[2. Suppression of Harmonic Component]

In addition, according to a switching performed by semiconductor elements, distorted waveforms are generated. The harmonic components in the distorted waveforms affect the device. In order to address this problem, for example, a filter that absorbs generated harmonic components can be inserted. In general, such a filter can be realized by a reactor or a capacitor that suppresses harmonic components.

However, in order to decrease the harmonic components leaking to the power system to a level that does not affect the device, a large-capacity filter is necessary. Accordingly, a reactor and a capacitor necessary for the filter become large, resulting in cost increase and weight increase.

According to this embodiment, a multi-level conversion device is configured to have unitary units C connected in series and in multi stages. Hence, the output waveform can become further close to a sinusoidal wave, thereby suppressing harmonic components.

[3. AC Voltage Output Operation]

Figure 4:
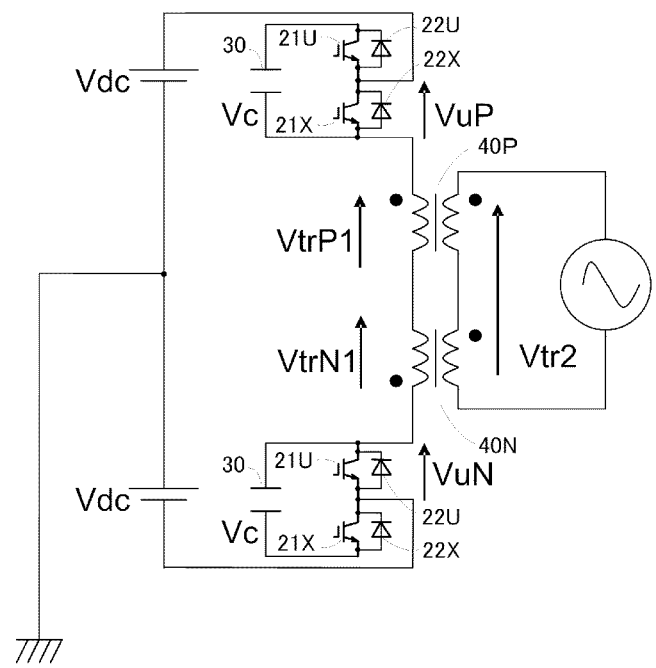
FIG. 4 is a circuit diagram having one phase simplified in FIG. 1.

An output operation of an AC waveform according to this embodiment will be explained with reference to FIGS. 4 to 6C. In FIG. 4, in order to simplify the explanation, the unitary unit C is indicated one each for the positive side and the negative side. First, as illustrated in FIG. 4, the neutral point of the DC power source is taken as a ground, and is also taken as a reference voltage.

Next, reference numerals are defined as follows:

Vu is a voltage at an AC output point as viewed from the ground.

Vdc is a positive/negative voltage of the DC power source.

Vc is a voltage of the capacitor 30 in the unitary unit C.

VuP is an output voltage of the unitary unit C connected to the positive power source side.

VuN is an output voltage of the unitary unit C connected to the negative power source side.

VuRef is an AC voltage instruction to be output calculated by an upper system.

In this case, the output voltage VuP of the positive unitary unit C is as follows.

$$VuP = Vdc - VuRef \quad \text{(Formula 1)}$$

Figure 5A:
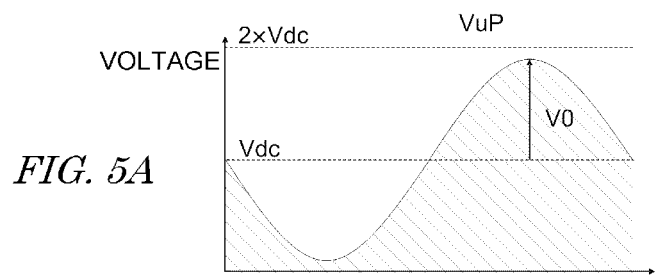
FIG. 5A is a diagram illustrating a voltage waveform of a positive-side unitary unit.
Figure 6A:
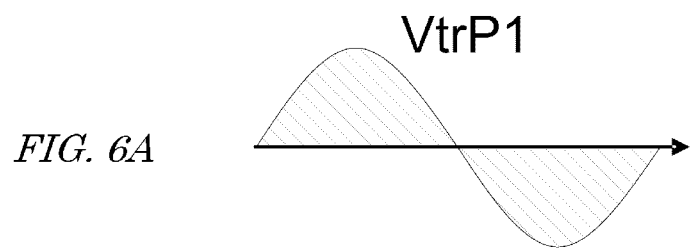
FIG. 6A is a diagram illustrating a voltage waveform of a primary winding of a positive-side transformer.

The voltage waveform of this VuP is illustrated in FIG. 5A. In addition, the waveform of a voltage VtrP1 of the primary winding at the positive transformer 40P is illustrated in FIG. 6A.

At this time, the output voltage Vu is output as follows.

$$Vu = Vdc - VuP = Vdc - (Vdc - VuRef) = VuRef \quad \text{(Formula 2)}$$

Conversely, the output voltage VuN of the negative unitary unit C is as follows.

$$VuN = Vdc - VuRef \quad \text{(Formula 3)}$$

Figure 5B:
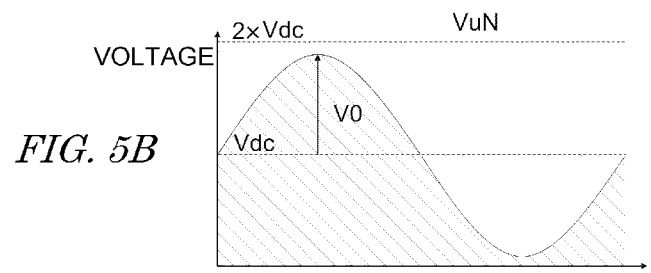
FIG. 5B is a diagram illustrating a voltage waveform of a negative-side unitary unit.
Figure 6B:
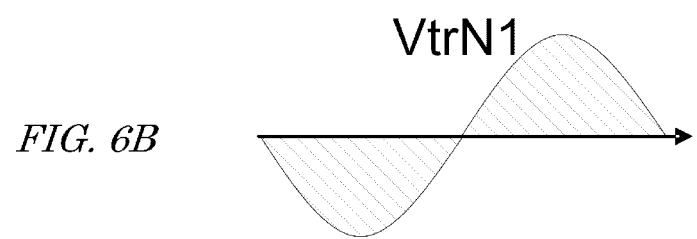
FIG. 6B is a diagram illustrating a voltage waveform of a primary winding of a negative-side transformer.

The voltage waveform of this VuN is illustrated in FIG. 5B. In addition, the waveform of a voltage VtrN1 of the primary winding at the positive transformer 40P is illustrated in FIG. 6B.

At this time, the output voltage Vu is output as follows.

$$Vu = -Vdc + VuN = -Vdc + (Vdc - VuRef) = -VuRef \quad \text{(Formula 4)}$$

Figure 6C:
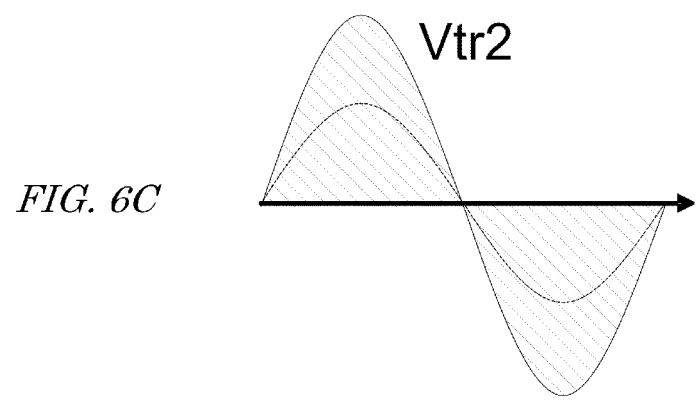
FIG. 6C is a diagram illustrating a voltage waveform of a secondary winding of the transformer.

The primary and secondary windings of the transformer 40P are subtractive polarity, and the primary and secondary windings of the transformer 40N are additive polarity. Hence, as illustrated in FIG. 6C, a voltage Vtr2 synthesized at the secondary side is output.

[4. DC Charging/Discharging Operation]

When an AC load current is Iu, this Iu flows through the positive unitary unit C and the negative unitary unit C, respectively. At this time, the capacitor 30 of the positive unitary unit C performs charging/discharging with power PowerP expressed by the following formula.

$$PowerP = VuP \times Iu = (Vdc - VuRef) \times Iu \quad \text{(Formula 5)}$$

When VuRef and Iu are in the same phase, i.e., when operation is carried out at a power factor of 1, the calculated average value of PowerP in one AC cycle becomes a negative value. That is, when the above-explained output voltage control is performed, the average value of the capacitor voltage in the positive unitary unit C cannot be maintained to be constant, and thus the operation cannot be continued.

Likewise, as to the capacitor voltage of the negative unitary unit C, when the power factor is 1, PowerN has a positive average value at AC one cycle. Hence, it becomes difficult to maintain the average value of the capacitor voltage to be constant, and thus the operation cannot be continued.

In order to address this technical problem, DC charging/discharging current is allowed to flow through a path from the positive side of the DC power source, the positive unitary unit C, the positive transformer 40P, the negative transformer 40N, the negative unitary unit C, and to the negative side of the DC power source. This stabilizes the average value of the capacitor voltage.

More specifically, a correction value ΔVfcControl which controls the average value of the capacitor voltage to be constant is calculated through the following formula. Next, based on this correction value ΔVfcControl, the output voltages Vup, VuN of the positive and negative unitary units are corrected and output.

$$\Delta VfcControl = G(s) \times (VCref - VCu\_AVE) \quad \text{(Formula 6)}$$

where:
VCref is a capacitor voltage instruction value of unitary unit C (a value set in advance);
VCu AVE is a capacitor voltage average value of U phase positive and negative whole unitary units; and
G(s) is a control gain, where s is a Laplace operator and proportional integral control is appropriate.

[C. Advantageous Effects of Embodiment]

According to this embodiment explained above, a sharp increase of the DC circulation current is suppressed by the leakage inductances at the primary side of the transformers 40P, 40N, thereby controlling the average value of the capacitor voltage of the unitary unit C to be constant. Hence, a compact power conversion device at low cost can be configured without installing a large and high-cost device like a buffer reactor.

Such a structure is advantageous when the structure is, in particular, configured as a multi-level conversion device. That is, the switching elements 21U, 21X have less necessary space than a reactor, etc., however when such switching elements are connected in a multi-stage manner, the necessary space increases according to an increased number of the switching elements. According to this embodiment, however, the space for a reactor can be saved. Therefore, even if the number of switching elements 21U, 21X to be connected increases, an increase in the size is avoidable.

[D. Other Embodiments]

The embodiment of the present disclosure is not limited to the above-explained form.

Figure 7:
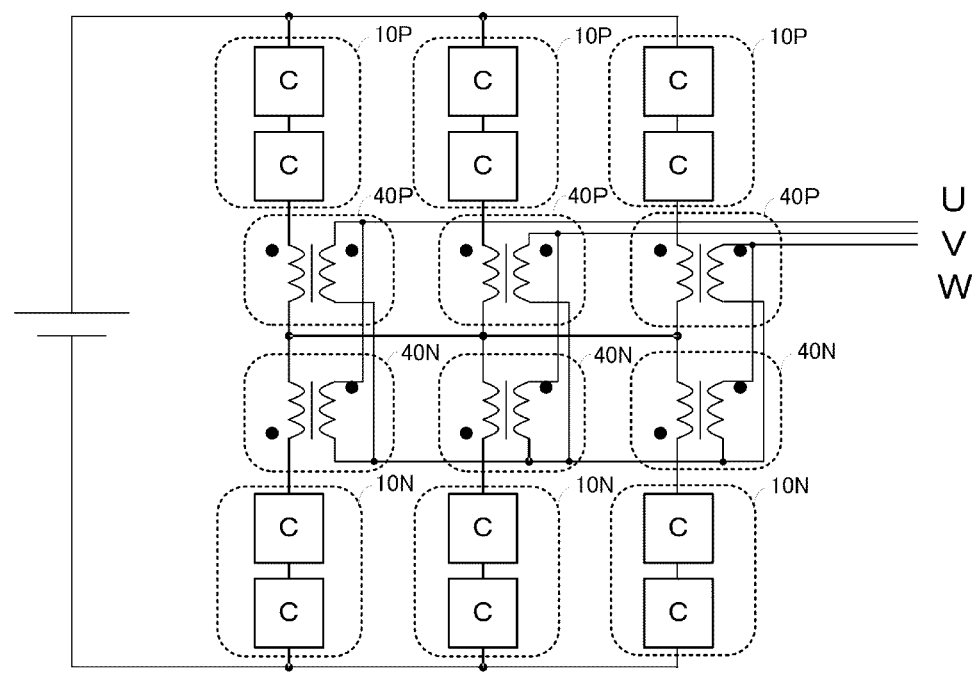
FIG. 7 is a circuit diagram illustrating an example case in which secondary windings of transformers are connected in parallel with each phase.

(1) For example, as illustrated in FIG. 7, in each phase of the aforementioned embodiment, the respective secondary windings of the transformers 40P, 40N may be connected in parallel. A series connection or a parallel connection is selected as needed in accordance with a DC system, an AC system, a load, etc., to be connected.

(2) In addition, according to the aforementioned embodiment, each phase is configured by the pair of transformers 40P, 40N. However, as illustrated in FIG. 8, the two transformers 40P, 40N may have a common iron core M.

Figure 8:
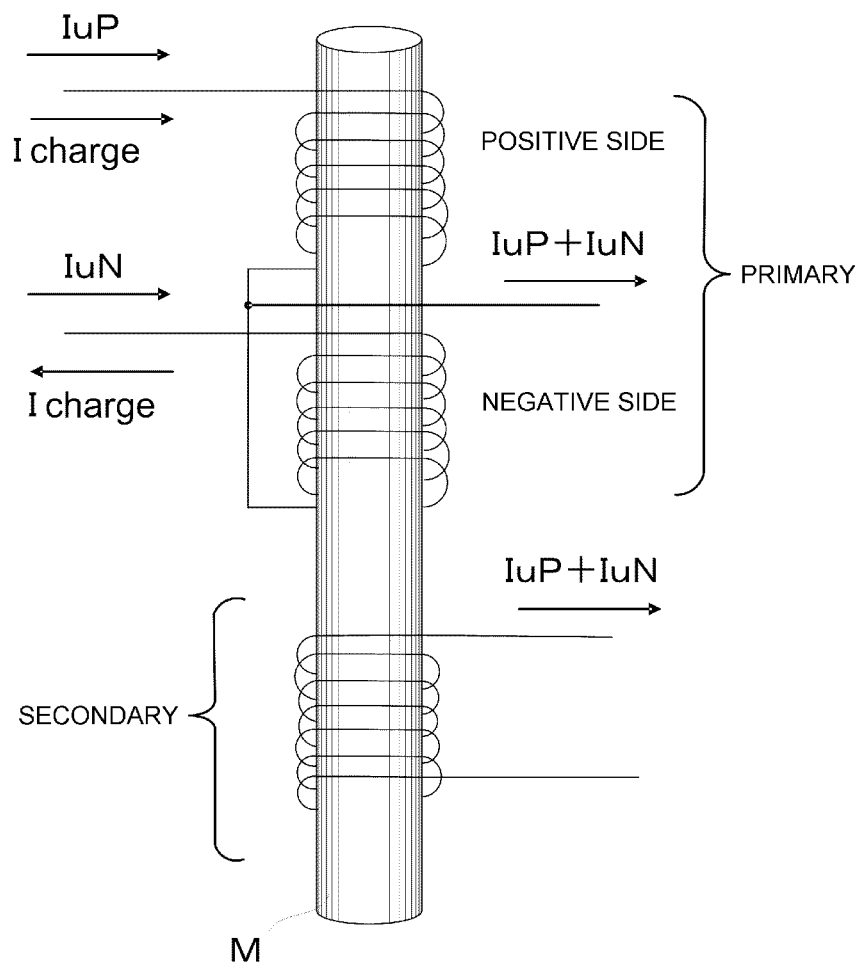
FIG. 8 is a structural diagram illustrating an example case in which the primary and secondary windings of a transformer in each phase are formed on a common iron core.

That is, as illustrated in FIG. 8, the primary winding and the secondary winding for each phase are wound around the common iron core M. Two primary windings are provided for the positive side and the negative side. The one primary winding has an end connected to an end of the unit arm 10P in each phase. The other primary winding has an end connected to an end of the unit arm 10N in each phase. The neutral points of the two primary windings are connected together.

The negative sides of the secondary windings in each phase are connected together through the three phases. The positive side of the secondary winding in each phase is connected to an AC side as a connection end of the U phase, the V phase, and the W phase.

According to such a structure, in the figure, as is indicated as Icharge, when a short-circuit current flows, it becomes a DC charging/discharging current of a capacitor. DC magnetic fluxes generated by this DC charging/discharging current are canceled with each other. Accordingly, the saturated flux density can be reduced, enabling a further downsizing of the iron core M. Note that IuP and IuN in the figure are positive and negative input currents, and IuP+IuN is an output current.

Such a transformer for each phase can be thought as a combination of two single-phase transformers or can be thought as a single transformer having two primary windings. In addition, as explained above, regarding the secondary winding in each phase, two windings may be connected in parallel.

Figure 9:
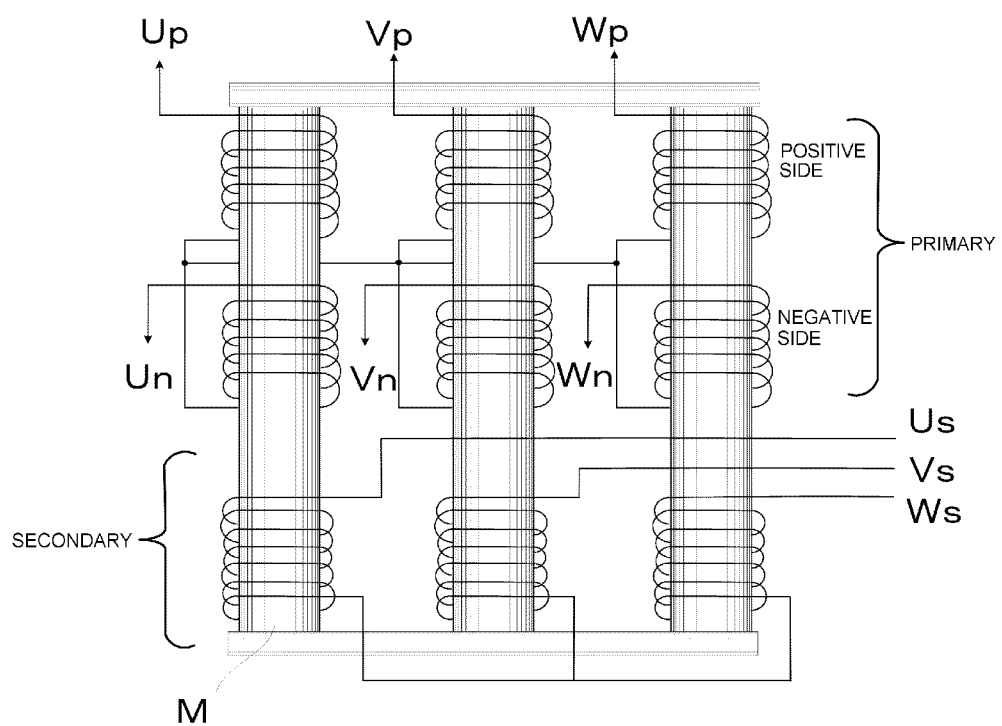
FIG. 9 is a structural diagram illustrating an example case in which a three-phase transformer is applied.

(3) Still further, according to the aforementioned embodiment, the transformers 40P, 40N are provided for respective three phases. However, as illustrated in FIG. 9, the aforementioned embodiment can be carried out through the winding structure of a three-phase transformer. For example, the following winding structure is employed in each leg of a three-phase/three-leg transformer.

That is, the three-phase transformer illustrated in FIG. 9 has two primary windings in each phase. Ends Up, Vp, and Wp of the one primary winding in the three-phase transformer are connected to the ends of the arms 10P in respective phases. Ends Un, Vn, and Wn of the other primary winding of the three-phase transformer are connected to the ends of the arms 10N in respective phases. The neutral points of the two primary windings of the three-phase transformer in each phase are connected together.

The negative sides of the secondary windings of the three-phase transformer are connected together among the three phases. Positive ends Us, Vs, and Ws of the secondary winding of the three-phase transformer in each phase are connected to the AC side as the U phase, V phase, and W phase connection ends.

According to such a structure, an advantageous effect originating from the mutual cancelation of the DC magnetic fluxes in respective phases as explained above can be obtained. In addition, since it is configured by a three-phase/three-leg transformer, etc., a further downsizing can be accomplished. As explained above, as to the secondary winding of each phase, two windings may be connected in parallel.

(4) The aforementioned embodiment can perform a conversion from DC to AC and from AC to DC through the similar structure. That is, the power conversion device of the aforementioned embodiment can be utilized as an inverter and a converter. In addition, the AC system side of the power conversion device may be subjected to a delta connection, or may be subjected to a three-phase Y connection with a neutral point.

(5) The specific example of the present disclosure was explained in the present specification, but the specific example is merely presented as an example, and is not intended to limit the scope and spirit of the present disclosure. The present disclosure can be carried out in other various forms, and permits various omissions, replacements, and modifications without departing from the scope and spirit of the present disclosure. Such forms and modifications thereof are within the scope and spirit of the present disclosure, and are also within the equivalent range of the subject matter as recited in appended claims.

The invention claimed is:

1. A power conversion device comprising:
a plurality of switching elements that performs conversion between DC and AC upon switching;
a plurality of unitary units comprising the switching elements and a capacitor;
a plurality of unit arms comprising at least one of the unitary units; and
a transformer having a primary winding connected between a pair of the unit arms so as to suppress a short-circuit current by a leakage inductance component,
wherein
the plurality of switching elements in each unitary unit are connected in series;
the capacitor in each unitary unit is connected with the plurality of switching elements in parallel;
the one or the plurality of unitary units in the unit arm are connected in series;
the pair of unit arms are provided corresponding to each of three phases;
the transformer is a single-phase transformer provided two each for each phase;
an end of one of the plurality of unit arms in each phase is connected to a positive side of the primary winding of the one single-phase transformer;
an end of another of the plurality of unit arms in each phase is connected to a positive side of the primary winding of the other single-phase transformer;
respective negative sides of the primary windings of both single-phase transformers in each phase are connected together;
the negative sides of the primary windings of both single-phase transformers in each phase are also connected together among the three phases;
secondary windings of both single-phase transformers in each phase are connected together; and
negative sides of the secondary windings of both single-phase transformers in each phase are also connected together among the three phases.

2. The power conversion device according to claim 1, wherein the respective secondary windings of the two both single-phase transformers in each phase are connected together in series.

3. The power conversion device according to claim 1, wherein the respective secondary windings of the two both single-phase transformers in each phase are connected together in parallel.

4. The power conversion device according to claim 1, wherein both single-phase transformers in each phase have a common iron core.

5. A power conversion device comprising:
a plurality of switching elements that performs conversion between DC and AC upon switching;
a plurality of unitary elements and a capacitor;
a plurality of unit arms comprising at least one of the unitary units; and
a transformer having a primary winding connected between a pair of the unit arms so as to suppress a short-circuit current by a leakage inductance component,
wherein
the plurality of switching elements in each unitary unit are connected in series;
the capacitor in each unitary unit is connected with the plurality of switching elements in parallel;
the one or the plurality of unitary units in the unit arm are connected in series;
the pair of unit arms are provided corresponding to each of three phases;
the transformer comprises the primary winding and a secondary winding wound around a common iron core for each phase;
the primary windings are provided two each for each phase;
an end of one of the plurality of unit arms in each phase is connected to the one primary winding of the transformer;
an end of another of the plurality of unit arms in each phase is connected to the other primary winding of the transformer;
neutral points of the two primary windings of the transformer in each phase are connected together; and
negative sides of the secondary windings of the transformer in respective phases are connected together among three phases.

6. A power conversion device comprising;
a plurality of switching elements that performs conversion between DC and AC upon switching;
a plurality of unitary u elements and a capacitor;
a plurality of unit arms comprising at least one of the unitary units; and
a transformer having a primary winding connected between a pair of the unit arms so as to suppress a short-circuit current by a leakage inductance component,
wherein
the plurality of switching elements in each unitary unit are connected in series;
the capacitor in each unitary unit is connected with the plurality of switching elements in parallel;

the one or the plurality of unitary units in the unit arm are connected in series;
the pair of unit arms are provided corresponding to each of three phases;
the transformer is a three-phase transformer having two primary windings for each phase;
an end of one of the plurality of unit arms in each phase is connected to the one primary winding of the three-phase transformer;
an end of another of the plurality of unit arms in each phase is connected to the other primary winding of the three-phase transformer;
neutral points of the two primary windings of the three-phase transformer in each phase are connected together; and
negative sides of secondary windings of the three-phase transformer in respective phases are connected together among three phases.

* * * * *